United States Patent Office 3,412,010
Patented Nov. 19, 1968

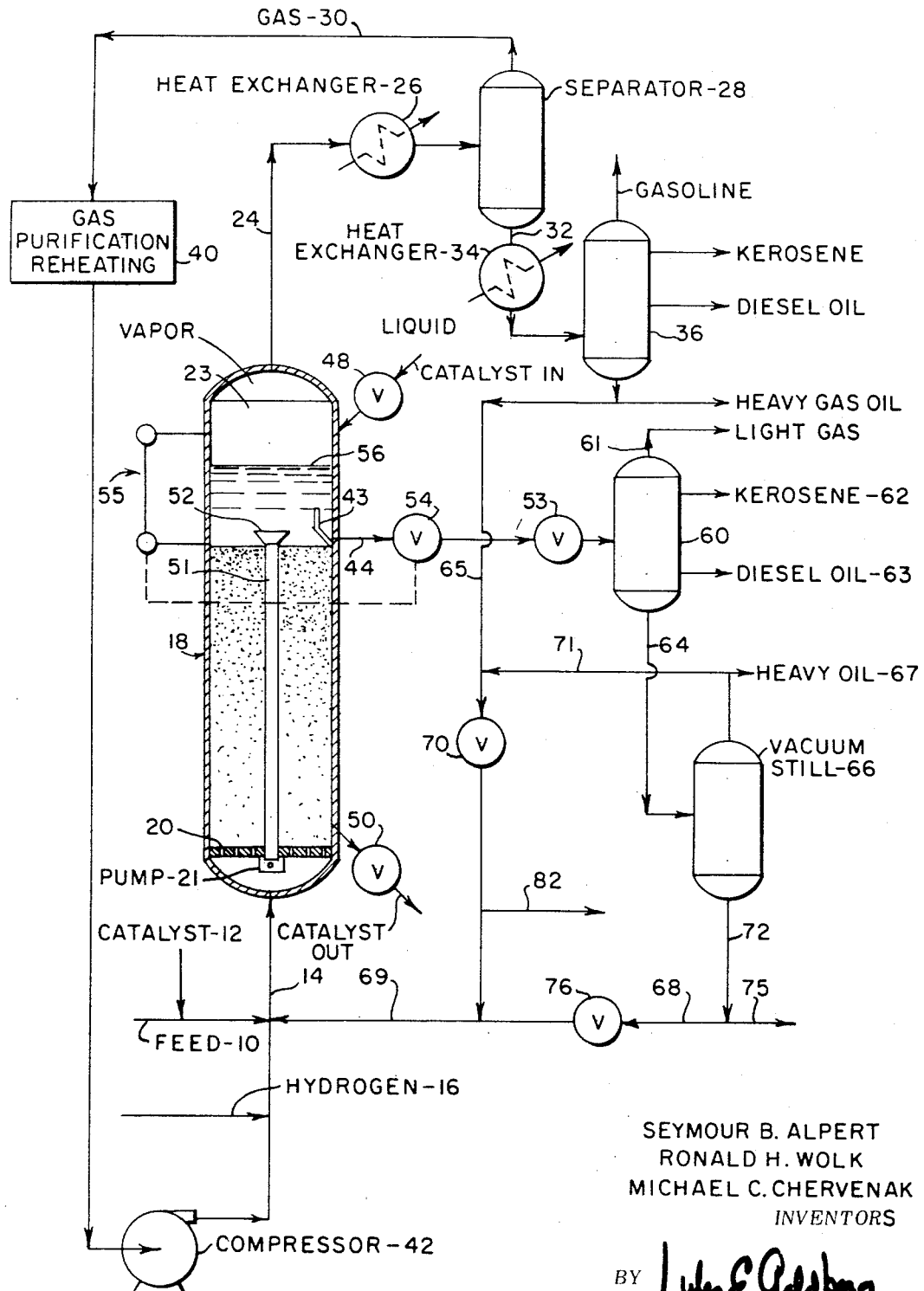

3,412,010
HIGH CONVERSION LEVEL HYDROGENATION
OF RESIDUUM
Seymour B. Alpert, Princeton, Ronald H. Wolk, Lawrence Township, Mercer County, and Michael C. Chervenak, Pennington, N.J., assignors to Hydrocarbon Research, Inc., New York, N.Y., a corporation of New Jersey
Continuation of applications Ser. No. 563,831 and Ser. No. 563,833, July 8, 1966. This application Nov. 21, 1967, Ser. No. 684,700
10 Claims. (Cl. 208—112)

ABSTRACT OF THE DISCLOSURE

A process for the hydrogenation of a petroleum residuum containing at least 25 volume percent of material boiling above 975° F. by reacting the feed with hydrogen at elevated temperatures and pressures in an ebullated catalytic bed reactor, separating the vaporous from the liquid effluents, fractionating the effluents to produce fractions boiling above 680° F. and recycling one of these fractions to the reactor, which recycle results in prolonged reactor life, increased conversion of the 975° F. plus material in the feed at lower severity levels and prevention of precipitation of asphaltenes in the feed.

CROSS-REFERENCES TO OTHER APPLICATIONS

This application is a continuation of co-pending applications, High Conversion Level Hydrogenation of Residuum, Ser. No. 563,831, filed July 8, 1966 and High Conversion Level Hydrogenation of Residuum, Ser. No. 563,833, filed July 8, 1966 and now abandoned.

BACKGROUND OF THE INVENTION

This invention relates to improvements in the method of converting residual petroleum fractions to lower boiling materials. It specifically concerns itself with maintaining an operable system at higher levels of conversion of charge stock boiling above 975° F. than have been possible heretofore.

When converting a residuum by destructive hydrogenation the primary objective is to obtain as high a level of conversion of the residuum as is compatible with an operable system. The ultimate goal is, of course, to convert all of the charge stock boiling above 975° F. to lower boiling material such as gasoline, kerosene, jet fuel, diesel oil and heavy gas oil with the complete elimination of low grade higher boiling liquids.

It is understood that when converting a residuum by destructive hydrogenation under the necessary high temperature and pressure conditions, that many reactions take place including saturation, polymerization, cracking, desulfurization, denitrogenation, hydrogenation and similar reactions which all proceed simultaneously although usually at different rates. The results, then, are basically empirical and are functions of feedstock characteristics, temperature, pressure, space velocity, hydrogen rate, catalyst type, and catalyst activity.

The catalytic hydrogenation of residuum is well-known and in the patent of Johanson, 2,987,465, a process is disclosed wherein the reaction is accomplished in the liquid phase with the heated residuum and hydrogen passed upwardly through a bed of catalyst at such a rate as to force the particles into random motion. The majority of the liquid passing through the bed can be recycled from a point above the top of the catalyst bed back through the inlet at the bottom.

One of the unique features of such a system is that operating conditions are controlled so as to eliminate any substantial carryover of catalyst from the reaction zone. The most beneficial feature of this type of operation is that the reaction zone is maintained at substantially isothermal conditions, It is, therefore, possible to utilize a higher average temperature, and because of the avoidance of high local temperatures, the catalyst tends to remain clean for a long period of time. In addition, due to the upward flow of the reactants and the expansion of the bed, any coke that might be formed is passed through the bed without difficulties, and the total pressure drop across the bed does not change.

SUMMARY OF THE INVENTION

It was found in a hydrogenation cracking operation that by fractionating the liquid and vaporous effluent from the reactor to produce 680° F. to 975° F. and 975° F. plus fractions and then recycling either of these fractions back to the reactor, significant improvement in operability could be obtained. In the case of the 975° F. recycle, a higher fresh feed space velocity, i.e., lower severity level, would be necessary to obtain the same residuum conversion than if this recycle was not practiced. At the same time, the product distribution was altered to produce a higher yield of heavy gas oil in the 680°–975° F. boiling range rather than gasoline.

When the recycle fraction is the 680°–975° F. heavy gas oil, a lower fresh feed space velocity may be used with a subsequent lower yield of heavy gas oil in the 680°–975° F. range, but an increased yield of naptha and furnace oil. Substantial improvement in operatibility is also obtained as a result of prevention of precipitation of the asphaltenic materials in the feed.

The objectives of our invention are to obtain a high space rate in a given reactor while maintaining the level of conversion at a high level in order to obtain the maximum yield of valuable products that can be produced and to achieve these objectives while maintaining long on-stream times.

DESCRIPTION OF THE DRAWING

Further objects and advantages of our invention will appear from the following description of a preferred form of embodiment thereof when taken with the attached drawing which is a schematic view of a hydrogenation process for high conversion of hydrocarbon oils.

DESCRIPTION OF THE PREFERRED EMBODIMENT

As more specifically shown in the drawing, a feed 10 of a residuum may be combined with a catalyst 12, which may be in the form of slurry, and fed by line 14 with hydrogen from line 16 through a reactor generally designated 18. As taught in the Johanson patent above referred to, the reactor may have a liquid distributor and catalyst support 20 so that the liquid and gas passing upwardly through the reactor 18 will tend to put the catalyst in random motion.

The catalyst particle size range is usually narrow for uniform expansion under controlled liquid and gas flow conditions. While the overall range is usually between 1/8″ and 325 mesh (U.S.S.), we contemplate a so-called once-through operation using catalyst in the 100–200 mesh range with a liquid velocity in the order of 5–10 gallons per minute per square foot of horizontal reaction space. Alternatively, larger catalyst, usually in the 1/32″ size, can be used by adequate recycle of heavy oil from the top to the bottom through the grid to provide from about 40 to 60 gallons total liquid per minute per square foot of horizontal reactor space. It is also possible, of course, to use catalyst in the 40–80 mesh range by proper selection of the liquid rate and the other relative operating variables. If larger catalyst is used, it may be necessary to use pressure control chambers, not shown, with the catalyst introduced through valve 48 and removed through valve 50.

By control of the catalyst particles size and density and liquid and gas velocities and taking into account the viscosity of the liquid and the lifting effect of the hydrogen under the operating conditions, the catalyst bed may be expanded to have a definite level or interface indicated at 22 in the liquid. It will be apparent that the settled level of the catalyst, as when the liquid rate drops below a catalyst sustaining value, will be considerably lower than level 22. Normally, bed expansion should be at least 10% and seldom over 300% of the static level, and the liquid rate will be usually in the range of 1 to 100 gallons per minute per square foot of horizontal cross section of the reactor.

In a reactor system of this type, we provide a vapor space 23 from which a vapor overhead, completely free of liquid, is removed at 24. This may be conveniently cooled and partially condensed in heat exchanger 26 and separated in separator 28 into a gaseous portion removed overhead at 30, and a liquid portion removed at 32. The gaseous portion 30, which is largely hydrogen, may be purified by conventional means 40 and after being reheated, can be recycled through compressor 42 to the feed line 14 to the reactor.

Internal circulation of liquid within the reactor from above the interface 22 to below the distributor deck 20 is also usually desirable to assure completeness of the reaction and to establish a sufficient upflow liquid velocity to assist in maintaining the catalyst in random motion (ebullated) in the liquid. This is preferably accomplished by the use of a central conduit 51 having an enlarged conical or funnel type cap 52. The conduit extends to a pump 21 below the distributor deck 20 to assure a positive and controlled movement of the liquid downwardly.

The recycle of liquid through internal conduit 51 has many mechanical advantages and tends to eliminate external high pressure connections as would be required in a hydrogenation reactor. Nevertheless, as described in the aforementioned Johanson patent, recycle can be established by an external pump.

The liquid portion 32 from separator 28 is cooled in heat exchanger 34 and then fractionated in distillation column 36 into fractions boiling in the gasoline range (overhead), kerosene and diesel oil (side streams), and a heavy gas oil with a boiling range between 680° F. to 975° F. in line 65.

A heavy liquid effluent from the reaction zone and free of catalyst is recovered from the liquid effluent in the upper part of reactor 18 by trap tray 43, such liquid in line 44 passing through pressure reducing valve 53 and being fractionated without cooling, in distillation column 60. Preferably, light products such as light gas, are removed overhead at 61, and kerosene and diesel oil boiling range materials are removed as side streams 62 and 63. A fuel oil fraction is removed at 64 as bottoms.

Design and operation of the vapor section 23 of the reactor is critical to the successful operation of the entire plant in that the vapor stream must be free of droplets or mist for the high concentration of asphaltenic materials present in these liquid droplets will be completely precipitated by the paraffinic naphtha that is present when all of the condensible materials in this stream are in the liquid form. This would, of course, result in fouling of all exchanger surfaces, pipe surfaces, valves and vessel walls.

The fuel oil fraction 64, which for the most part, boils above 680° F., is passed to a vacuum still 66 and fractionated into a heavy gas oil boiling in the range 680°–975° F. removed in line 67 and a bottoms material boiling above 975° F., which is removed in line 72.

A portion of the heavy gas oil in line 67 may be removed in line 71 and combined with that in line 65 and all or part may be recycled back to the reactor through valve 70 and line 69. If desired, all or part of the heavy gas oil material may be removed through line 82.

All or part of the 975° F. plus material in line 72 may be recycled to the reaction zone through line 68, valve 76 and line 69. That portion not being recycled is removed through line 75.

The valve control means for independent recycle and withdrawal of the fractions as described above are not shown as their position and use would be apparent to those skilled in the art.

By this practice, deposits of coke-catalyst agglomerates in the reactor are avoided, whereas if recycle of the fractions boiling above 680° F. is not practiced, coke-catalyst deposits in the reactor could cause the process to become inoperable and result in short on-stream times.

The following examples are illustrative of operations in accordance with this invention.

EXAMPLE I

Two experiments were carried out in the Kuwait vacuum bottoms feed. Both experiments were carried out in similar pilot plants. Each unit had a reactor having a volume of 400 cc. and an inside diameter of 0.614 inch. The catalyst used was 1/32″ diameter cobalt molybdate catalyst in the form of 1/32″ extrudates. In the first experiment (designated as Case 1), a conversion level of 89.3% (conversion of feed boiling above 975° F. to lower boiling products) was obtained at a temperature of 847° F., a hydrogen pressure of 2250 pounds and a fresh feed space velocity of 0.54 volume of oil per hour per volume of reactor, and a hydrogen rate of 6000 standard cubic feet per barrel.

A similar experiment was carried out, but in this case (Case 2), recycle of the product fraction boiling in higher than about 975° F. was practiced. At a temperature of 850° F., a pressure of 2250 pounds, a fresh feed space velocity of 1.01 volumes of oil per hour per volume of reactor and a 975° F.+ recycle feed of 0.53 volume of recycle per hour per volume of fresh feed and a hydrogen rate of 5100 standard cubic feet per barrel were necessary. The conversion level was 92.8% in this latter case, slightly higher than in the first experiment.

A striking effect resulted in that this conversion level was obtained at about twice the space velocity (1.01 V./hr./V. vs. 0.54 V./hr./V.) as in the first experiment. Thus, at about the same temperature, the throughput of oil necessary to achieve the desired conversion level was higher when recycle of the product fraction boiling higher than 975° F. was practiced. Other benefits obtained were the lowering of the gas yields from 7.6% in the first case to 4.9% in the second case, and higher yields of 680–975° F. heavy gas oil, and a lowered yield of $C_4$–400° F. naphtha than obtained in the first experiment. In addition, the quality of the 975° F.+ product fraction and the 680–975° F. product fraction was higher in the recycle case.

Details of these runs are shown on the following table:

TABLE I.—H-OIL PROCESSING OF KUWAIT VACUUM BOTTOMS AT 90% CONVERSION RECYCLE AND SINGLE PASS OPERATION

|  | No Recycle | Recycle |
| --- | --- | --- |
|  | Case 1 | Case 2 |
|  | Run Number 84–105 | Run Number 72–118 |
|  | Period 9B | Period 7 |
| Fresh Feed | Kuwait Vacuum Bottoms | |
| Temperature, °F | 847 | 850 |
| Pressure, p.s.i.g | 2,250 | 2,250 |
| Fresh Feed, Space Velocity, ($V_f$/hr./$V_r$) | 0.54 | 1.01 |
| 975° F.+ Recycle Feed, $V_r/V_t$ | 0 | 0.53 |
| $H_2$ Rate, s.c.f./bbl | 6,000 | 5,100 |
| $H_2$ Consumption, s.c.f./bbl | 1,360 | 1,200 |
| Conversion of 975° F.+ in feed percent | 89.3 | 92.8 |
| Catalyst Age, bbl./lb | 1.24 | 1.42 |
| $C_1$ Wt. Percent Yield | 2.0 | 1.6 |
| $C_2$ Wt. Percent Yield | 2.2 | 1.5 |
| $C_3$ Wt. Percent Yield | 3.4 | 1.8 |
| $C_4$+ Liquid Product: | | |
| V. Percent Yield | 104.6 | 106.1 |
| °API [1] | 31.5 | 28.5 |
| Sulfur, Wt. Percent [2] | 1.05 | 1.25 |
| RCR, Percent [3] | | |
| $C_4$–400° F.: | | |
| V. Percent | 31.2 | 22.0 |
| °API | 64.5 | 59.9 |
| Sulfur, Wt. Percent | 0.10 | 0.11 |
| Aniline Point (IBP-400° F.), °F | 128 | 128.5 |
| 400–680° F.: | | |
| V. Percent | 39.9 | 34.9 |
| °API | 33.7 | 33.7 |
| Sulfur | 0.35 | 0.63 |
| Aniline Point, °F | 133.5 | 135.0 |
| 680–975° F.: | | |
| V. Percent | 22.8 | 37.4 |
| °API | 16.1 | 19.0 |
| Sulfur | 1.30 | 1.8 |
| Aniline Point, °F | 154.0 | 159.0 |
| 975° F.+: | | |
| V. Percent | 10.7 | 11.8 |
| °API | –1.0 | 0.5 |
| Sulfur, Wt. Percent | 3.30 | 3.5 |
| RCR | 37.23 | 30.0 |
| Catalyst | (4) | (4) |

[1] Feed, 7.7.
[2] Feed, 5.53.
[3] Feed, 16.67.
[4] 1/32″ extrudates cobalt molybdate on alumina.

EXAMPLE II

The ability to obtain a conversion level at a higher space velocity is evident from Example I. This effect can be used to operate at a lower temperature than required when recycle of 975° F. product fraction is not practiced. At the same space velocity it is possible to operate at a lower temperature when recycling the product fraction boiling above about 975° F., Table II shows this effect. When recycling the product fraction boiling about 975° F. a temperature of 835° F. was required as compared with a reactor temperature of 850° F. that was necessary when recycle of the product fraction boiling above 975° F. was not practiced. The same advantage in product distribution, i.e., lower gas yield, lower naphtha yield and a higher yield of heavy gas oil were again evident.

In the case where recycle of the product fraction boiling over 975° F. was not practiced, long on-stream times could not be achieved. Deposits of coke-catalyst agglomerates in the reactor resulted from settling out of asphaltenic materials in the reactor. On the other hand, when recycle of the product fraction was practiced, long on-stream times were achieved:

TABLE II

|  | Recycle Operation | Single Pass Operation |
| --- | --- | --- |
| Run Number | 159–22 | 159–22 |
| Period | 25 | 10 |
| Fresh Feed | (1) | (1) |
| Temperature, °F | 835 | 850 |
| Hydrogen Partial Pressure, °F | 1,500 | 1,500 |
| Space Velocity, $V_f$/hr./$V_r$ | 0.75 | 0.78 |
| Recycle Material | (2) | (3) |
| Recycle Ratio $V_R/V_{FF}$ | 0.42 | --- |
| Total 975° F.+ Conversion | 82.6 | 83.4 |
| Yields: | | |
| $C_4$+ liquid | 105.5 | 103.1 |
| $C_1$–$C_3$ Wt. percent | 3.3 | 5.1 |
| $C_4$–400 V. percent | 16.8 | 21.1 |
| 400–680 | 27.0 | 34.7 |
| 680–975° F | 42.3 | 30.9 |
| 975° F.+ V. percent [4] | 19.4 | 16.4 |
| API: | | |
| $C_4$+ liquid | 22.3 | 25.7 |
| $C_4$–400 | 62.0 | 63.9 |
| 400–680 | 32.9 | 33.6 |
| 680–975 | 17.5 | 17.2 |
| 975° F.+ [5] | 0.2 | –3.2 |
| Wt. Percent S: | | |
| $C_4$+ liquid | 2.09 | 1.56 |
| $C_4$–400 | 0.15 | 0.15 |
| 400–680 | 0.98 | 0.41 |
| 680–975 | 2.11 | 1.86 |
| 975° F.+ [6] | 3.83 | 3.68 |
| Catalyst | (7) | (7) |

[1] Kuwait Vacuum Bottoms.
[2] 975° F.+ Product.
[3] None.
[4] Feed, 100.
[5] Feed, 7.5.
[6] Feed, 5.4.
[7] 100–200 mesh microspheres cobalt molybdate on alumina.

EXAMPLE III

H-Oil processing of Kuwait vacuum bottoms comparison of recycle of 680–975° F. heavy gas oil to extinction and single pass operation.

|  | Recycle Operation | Single Pass Operation |
| --- | --- | --- |
| Run | 159–22 | 159–21 |
| Period | 21 | 9/12B |
| Catalyst | (1) | (1) |
| Operating conditions: | | |
| Hydrogen Pressure, p.s.i.g | 1,500 | 1,500 |
| Space Velocity, $V_f$/hr./$V_R$ | 0.38 | 0.96 |
| Temperature, °F | 865 | 865 |
| Recycle ratio V680–975° F./$V_F$ | 1 | 0 |
| Hydrogen rate, s.c.f./bbl.v.b. feed | 12,000 | 6,300 |
| Catalyst addition rate, lb./bbl | 0.11 | 0.09 |
| Yields V. Percent on Feed: | | |
| $H_2S$ Wt. percent | 5.0 | 4.5 |
| $C_1$–$C_3$ Wt. percent | 7.7 | 4.6 |
| $C_4$–330 V. percent | 25.0 | 14.8 |
| 330–680 V. percent | 65.2 | 40.2 |
| 680–975 | --- | 32.0 |
| 975° F.+ | 15.9 | 16.8 |
| $C_4$+ Liquids V. percent | 106.1 | 103.8 |
| Gravities °API: | | |
| $C_4$+ | 32.6 | 25.6 |
| 330–680° F | 32.2 | 35.5 |
| 680–975° F | --- | 16.5 |
| 975° F.+ | –8.7 | –6.4 |
| Sulfur Contents: | | |
| $C_4$+ | 1.09 | 1.74 |
| 330–680° F | 0.52 | 0.78 |
| 680–975° F | --- | 2.01 |
| 975° F.+ | 3.91 | 4.02 |

[1] 100–200 mesh cobalt molybdate on alumina microspheres.

It was found that by separately distilling the liquid and vapor effluents from the reactor to separate the heavy gas oil fraction (680–975° F.) from both streams, combining the heavy gas oil streams and recycling the combined stream back to the reactor that heavy gas oil product could be completely eliminated. Data comparing this operation with a single pass non-recycle operation are presented in Example III. It should be noted that more than 90% naphtha and furnace oil ($C_4$–680° F.) was produced from vacuum bottoms residuum by this operation in a single reactor.

The use of a single reactor to carry out this conversion is quite important in those cases where the total feed to the unit is low. It becomes economically unattractive to take the effluent from the first reactor to an even smaller unit for high pressure hydrocracking.

Another important advantage which results from processing residuum by this method is the effect of the high concentration of heavy gas oil in the feed in keeping badly degraded asphaltenic materials present in the product from precipitating in the reactor or downstream equipment.

EXAMPLE IV

H-Oil processing of Kuwait vacuum bottoms comparison of recycle of heavy gas oil condensed from reactor vapor and single pass operation.

|  | Recycle Operation | Single Pass Operation |
| --- | --- | --- |
| Run | 159-22 |  |
| Period | 14B |  |
| Catalyst | (¹) | (¹) |
| Operating conditions: |  |  |
| Hydrogen Pressure, p.s.i.g | 1,500 | 1,500 |
| Space Velocity, $V_f$/hr./$V_R$ | 0.62 | 0.87 |
| Temperature, °F | 850 | 850 |
| Recycle ratio, V680-975° F./$V_F$ | 0.27 | (²) |
| Hydrogen Rate s.c.f./bbl.v.b.feed | 7,300 | 6,250 |
| Catalyst Addition rate, lb./bbl. | 0.14 | 0.10 |
| Yields, Percent on Feed: |  |  |
| H₂S Wt. percent | 4.6 | 4.5 |
| C₁-C₃ Wt. percent | 4.9 | 4.1 |
| C₄-330° F. V. percent | 16.2 | 12.4 |
| 330-400° F. V. percent | 7.8 | 5.9 |
| 400-680° F. V. percent | 41.0 | 32.3 |
| 680-975° F. V. percent | 18.7 | 33.2 |
| 975° F. V. percent | 19.9 | 20.0 |
| C₄+ liquids V. percent | 103.6 | 103.8 |
| Gravities, °API: |  |  |
| C₄+ | 25.7 | 24.9 |
| 330-400° F | 48.0 | 48.8 |
| 400-680° F | 32.9 | 33.9 |
| 680-975° F | 17.5 | 18.2 |
| 975° F | 0.2 | −0.3 |
| Sulfur Contents: |  |  |
| C₄+ | 1.45 | 1.26 |
| 330-400° F | 0.21 | 0.20 |
| 400-680° F | 0.67 | 0.41 |
| 680-975° F | 1.76 | 1.57 |
| 975° F+ | 3.68 | 3.0 |

¹ 100-200 mesh cobalt molybdate on alumina microspheres.
² None.

It was found that by condensing and fractionating the vapor effluent from the reactor to obtain a heavy gas oil product, and recycling this stream back to the reactor that it was possible to reduce the amount of heavy gas oil product and increase the naphtha and furnace oil product. When it is desired to produce some net amount of heavy gas oil, this method is quite useful. It is possible to eliminate the vacuum fractionation of liquid effluent from the reactor to produce a heavy gas oil recycle stream. In the simplest conception of this scheme the overhead stream leaving the reactor might be partially condensed and the heavy liquid from the condensation could be recycled without fractionation. Some differences would, of course, result in the product yield structure.

In the case where recycle of the product fraction boiling in the range of 680°-975° F. was not practiced, long on-stream times could not be achieved. At the same high conversion levels deposits of coke-catalyst agglomerates in the reactor resulted from settling out of asphaltenic materials in the reactor. On the other hand, when recycle of the product fraction was practiced long on-stream times were achieved. It is thought that the high percentage of heavy gas oil in the reactor liquid tends to keep asphaltenes in solution. These asphaltenes tend to precipitate in single pass operation.

In accordance with our invention, we find the following ranges of operating conditions to be particularly beneficial (depending on the type of feed stocks processed).

|  | Range | Preferred |
| --- | --- | --- |
| Temperature, °F | 750-900 | 850 |
| Pressure, p.s.i.g | 1,000-5,000 | 2,000-2,500 |
| Hydrogen throughput (s.c.f./bbl.) | 2,500+ | 5,000 |
| Space Velocity, $V_f$/hr./$V_r$ | 0.25-5.0 | 0.5-1.0 |
| Recycle | (¹) | (²) |
| Catalyst | (³) |  |
| Type of Catalyst | Cobalt molybdate, nickel molybdate on alumina base or alumina base containing same amounts of silica. |  |

¹ At least 25% of fresh feed.
² It was found by varying the recycle ratio of the 975° F.+product fraction that the yield of heavy gas oil could be varied. Ratios of greater than 1.0 produced a higher yield of 680-975° F. heavy gas oil than ratios of 0.5.
³ ⅛″ to 325 (USS) mesh.

The experience with the 680-975° F. fraction is considered to be approximately the same as with a 650°-1000° F. fraction and it will be understood that the precise cut depends to a large extent on refinery requirements.

While we have shown and described a preferred form of embodiment of our invention, we are aware that modifications may be made thereto which are within the scope and spirit of the description herein and of the claims appended hereinafter.

We claim:
1. The process of hydrogenating and hydrocracking a reduced crude having at least 25 vol. percent boiling above 975° F. which comprises:
   (a) passing said crude at a temperature in the range of 750-900° F. and a pressure in the order of 1000-5000 p.s.i.g. together with at least 2500 s.c.f./bbl. of hydrogen, upwardly through a reaction zone in the presence of a hydrogenation type catalyst having a narrow size range, said range falling between ⅛″ and 325 mesh;
   (b) the flow velocities of liquid and hydrogen upwardly through the catalyst being such as to expand the bed of catalyst at least 10% over the settled stated volume and to maintain the catalyst in random motion in the liquid;
   (c) the space velocity of the liquid being such as to accomplish more than 50% conversion of the 975° F. plus boiling components in the feed and to partially remove sulfur;
   (d) separating the effluent from the reaction zone into a gas phase and a liquid phase;
   (e) fractionating the vapor phase and the liquid phase to separate out fractions boiling above about 680° F;
   (f) and recycling one of said fractions to the reaction zone at a rate equivalent to at least 25 vol. percent of the feed.

2. The process of claim 1 wherein the pressure is in the order of 2000-2500 p.s.i.g.; the temperature is in the order of 850° F., the recycle rate is at least 50 vol. percent of the feed, the hydrogen throughput is at least 5000 s.c.f./bbl., the feed is a Kuwait vacuum bottoms, the space velocity is at least 0.25 $V_f$/hr./$V_r$, and the total conversion is in excess of 90% of the 975° F. plus fraction.

3. The process of claim 1 wherein the temperature range in the reaction zone is between about 800° F. and 900° F., the pressure is in the range of 1500 to 3000 p.s.i.g., the space velocity accomplishes a conversion in excess of 50% and below 75% per pass and the total conversion of 975° F. plus is in excess of 90%.

4. The process of claim 1 wherein the fraction recycled boils in excess of 975° F.

5. The process of claim 4 wherein the recycle ratio of 975° F.+ production fraction is maintained at least 1.0 of the feed whereby the production of heavy gas oil boiling in the 680-975° F. range is maximized.

6. The process of claim 4 wherein the recycle ratio of 975° F.+ product fraction is maintained at least 0.50 of the feed whereby the temperature in the reaction zone is lower than would otherwise be required for the same conversion of the 975° F.+ fraction.

7. The process of claim 4 wherein the recycle ratio of the feed whereby the pressure in the reaction zone is lower than would otherwise be required for the same conversion of the 975° F.+ fraction.

8. The process of claim 4 wherein the recycle ratio of 975 F.+ product fraction is maintained at least 0.50 of the feed whereby the quality of 680–975° F. production fraction and the 975° F.+ product is superior to a process with less recycle.

9. The process of claim 1 wherein the fraction recycled boils in the range from about 680° F. to about 975° F.

10. The process as claimed in claim 9 wherein no part of the fraction boiling between 680° F. and 975° F. is removed as product from the system.

References Cited

UNITED STATES PATENTS

| | | | |
|---|---|---|---|
| 3,151,060 | 9/1964 | Garbo | 208—108 |
| 3,207,688 | 9/1965 | Van Driesen | 208—108 |
| 3,321,393 | 5/1967 | Schuman et al. | 208—108 |

DELBERT E. GANTZ, *Primary Examiner.*

A. RIMENS, *Assistant Examiner.*

UNITED STATES PATENT OFFICE
CERTIFICATE OF CORRECTION

Patent No. 3,412,010                             November 19, 1968

Seymour B. Alpert et al.

It is certified that error appears in the above identified patent and that said Letters Patent are hereby corrected as shown below:

Column 9, line 7, after "of" insert -- $975°$ F. + product fraction is maintained at least 0.50 of --.

Signed and sealed this 21st day of April 1970.

(SEAL)
Attest:

Edward M. Fletcher, Jr.                        WILLIAM E. SCHUYLER, JR.
Attesting Officer                                  Commissioner of Patents